United States Patent Office 3,249,805
Patented May 3, 1966

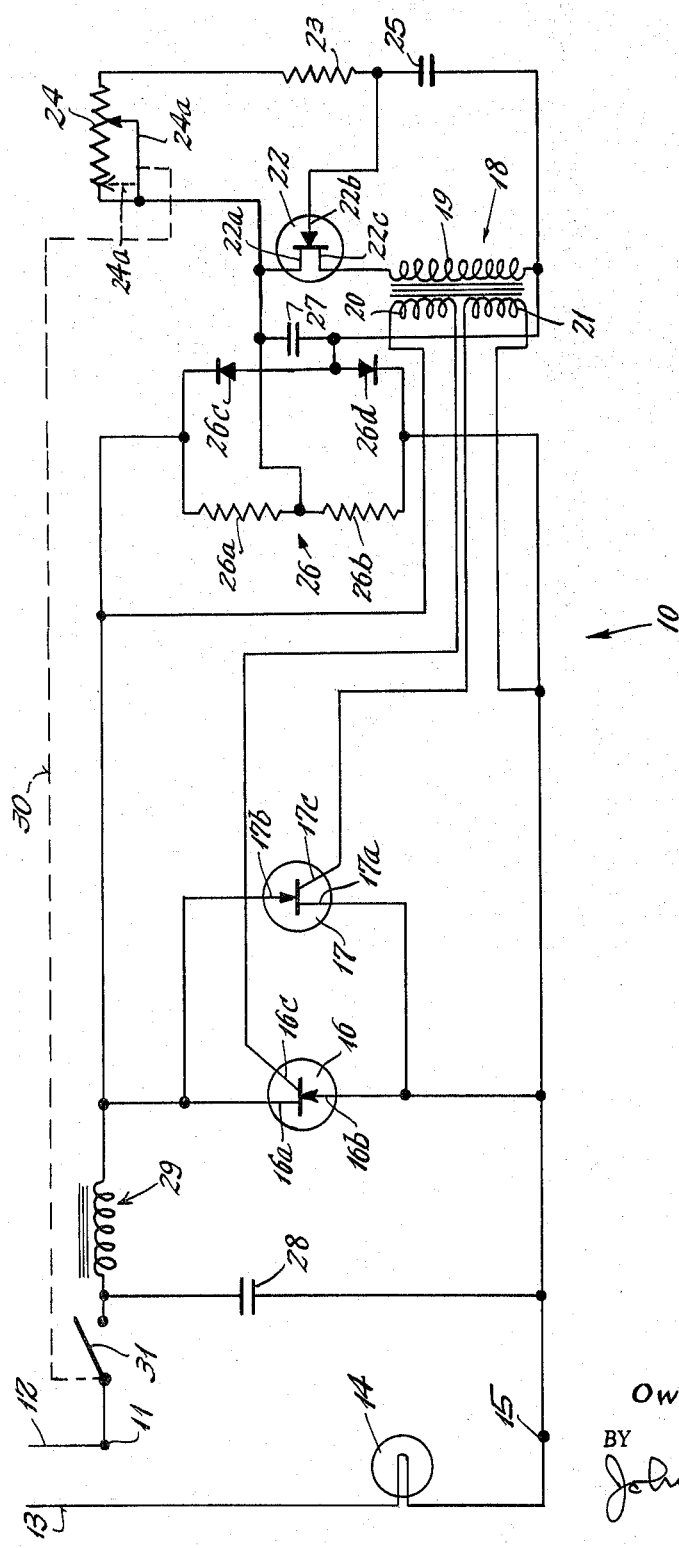

---

3,249,805
LIGHT CONTROL CIRCUIT
Owen J. McCabe, Bristol, Conn., assignor to The Superior Electric Company, Bristol, Conn., a corporation of Connecticut
Filed Apr. 26, 1962, Ser. No. 190,446
2 Claims. (Cl. 315—194)

The present invention relates to an electrical control circuit for enabling the adjustment of the amount of electric power to an electric light to control the illumination therefrom and more particularly to such a circuit which employs semi-conductor elements.

While the desirability of controlling the amount of illumination from electric lights has heretofore been known, prior devices have not been completely satisfactory. Problems have been encountered, for example, with the difficulty of installation because of their size particularly where the device is to replace a switch. Normally such devices as heretofore proposed have required a larger electrical box into which the device may be placed within a wall as they were too large for the normal switch box which they replaced. Additionally, such devices were relatively expensive for the amount of light controlled and were heat producing making them possible safety hazards. However, with the advent of semiconductor elements in which relatively large amounts of power may be controlled by small elements and particularly a silicon controlled rectifier (SCR), these semiconductor elements have been found advantageous for controlling illumination. Moreover, they may be easily substituted for the on-off switch currently employed as they are capable of fitting within the normal electrical switch box and little, if any, change in the existing wiring being required.

It is accordingly an object of the present invention to provide an electric power circuit that enables adjustment of the amount of light from an electric lamp and which employs semiconductor elements which may be advantageously contained in a small space and hence be capable of being contained within a normal electric switch box.

A further object of the present invention is to provide such an adjustable control device which is simple in construction, reliable in use and is relatively economical to manufacture.

Another object of the present invention is to provide in such an electric power control having semiconductor elements for the prevention of a change in the set illumination because of current surges in the line and to prevent interference with radio receivers by the operation of the semiconductor elements.

A feature of the present invention resides in an electrical control circuit which may be placed in series with an electric lamp, such as an incandescent lamp, and by controlling the amount of power to the lamp, consequent control over the illumination from the lamp is exercised. This is effectuated, according to the present invention, by employing a variable resistance which through a resistance-capacitor network varies the amount of power conducted by a semiconductor element particularly a plurality of SCR's by adjusting the conduction time for each half cycle of the alternating current line voltage. It will accordingly be appreciated by varying the firing time for each half cycle of the SCR's that the amount of power to the lamp may accordingly be controlled.

Other features and advantages will hereinafter appear.

Referring to the drawing, FIGURE 1, the only figure, is an electrical schematic diagram of the present invention shown connected for controlling the amount of illumination. The circuit is generally indicated by the reference numeral 10 and has a terminal 11 connected to one line 12 of an alternating current source such as the usual 120 volt household current. The other alternating current source line 13 is connected to one side of an incandescent electric bulb 14 whose other side is connected to the other terminal 15 of the circuit of the present invention. Coupled across the two terminals 11 and 15 are a pair of silicon controlled rectifiers 16 and 17 with their forward conduction being oppositely disposed.

Each rectifier (16 and 17) has a cathode 16a and 17a, an anode 16b and 17b and a gate 16c and 17c. A transformer 18 has a primary winding 19, a first secondary winding 20 and a second secondary winding 21 with the winding 20 being connected across the cathode 16a and gate 16c of the SCR 16. Similarly the cathode and gate of the SCR 17 is connected across the winding 21.

It will be appreciated that upon an electric pulse of sufficient magnitude occurring in the winding 19 that such pulse will appear across the cathode-gate of the SCR's 16 and 17. If the direction of current through the SCR is from the anode to cathode (i.e. the forward direction) the SCR will be rendered conducting for the remainder of the forward current in this direction after having received the pulse. As the power from the source lines 12 and 13 is alternating current, each SCR is only operable for controlling forward current conduction for one half the alternating current cycle, the other SCR being capable of controlling conduction during the other half of the cycle. By varying the time during each half cycle when one or the other of the SCR's is conducting, the amount of power to the lamp 14 may be controlled and hence consequently control the illumination from the lamp.

For providing the electric pulse in the transformer winding 19 at the time of the cycle such that the desired amount of power is delivered by the SCR's, there is provided, according to the present invention, a unijunction transistor 22 having a first base 22a connected to its emitter 22b through a resistance 23 and a variable resistance 24 having a slider 24a. The second base 22c of the unijunction transistor 22 is connected through the primary winding 19 and a condenser 25 to the emitter 22b. The resistances 23 and 24 together with the condenser 25 form a resistance-capacitor network. For supplying unidirectional power to the unijunction transistor, the present invention employs a resistance-rectifier bridge 26 having a pair of adjacent resistance legs 26a and 26b and a pair of adjacent diode legs 26c and 26d.

It will be appreciated that the alternating current from the input terminals 11 and 15 is rectified by the bridge 26 to provide a positive potential at the base 22a and a negative potential at the junction between the condenser 25 and the winding 19. When the variable resistor 24 is changed from its maximum resistance position (the dotted line position of the slider 24a) to its minimum it varies the charging rate of the condenser 25 for each half cycle of the alternating current source. When the voltage across the condenser 25 has a value which biases the emitter 22b positively with respect to the base 22c, current flows through the base 22c and the winding 19 providing a pulse which is sufficient to fire the SCR's. The values of the elements in the resistance-capacitor network are such that at the maximum resistance of the slider 24a position causing the charging rate is so slow that the condenser 25 does not for each half cycle have a voltage thereacross which positively biases the emitter 22c while at the minimum value of resistance of the resistor 24, the charging rate is so fast that it almost instantaneously forwardly biases the emitter 22c. Thus by varying the rate to which the condenser 25 is charged, the time of firing of the SCR's during each half cycle is accordingly adjusted.

In carrying out the present invention there is provided means for preventing current surges in the A.C. source in the lines 12 and 13 from effecting positive biasing of the emitter 22c of the unijunction transistor prior to the time set by the variable resistance 24 and this is effectively accomplished by the use of a condenser 27 connected across the D.C. output of the bridge 26.

Moreover according to the present invention if the operation of the SCR's creates radio interference such interference is obviated by a condenser 28 connected across the input terminals 11 and 15 and a choke 29.

The variable resistance slider 24a is connected, as shown by the dotted line 30, to an on-off switch 31 so that when the slider 24a is at its dotted line position, the switch 31 is opened to disconnect the circuit from the source lines 12 and 13.

It will accordingly be appreciated that there has been disclosed an electric power circuit for controlling the amount of illumination from an incandescent bulb by controlling the power to the bulb. The apparatus is simple and compact and includes a pair of oppositely disposed silicon controlled rectifiers whose time of firing in their respective forward direction is controlled during each half cycle by means of a resistance-capacitor network. Changing the resistance in said network enables the amount of power to be changed and hence control the amount of illumination from the lamp. Furthermore the circuit of the present invention prevents misfiring of the SCR's which may be caused by voltage surges in the alternating current source and radio interference is obviated.

Variations and modifications may be made within the scope of the claims and portions of the improvements may be used without others.

I claim:

1. An electric circuit adapted to be connected in series with an electric lamp across an alternating current source for adjustably controlling the amount of power to the electric lamp to thereby vary the illumination thereof comprising a pair of terminals, a pair of silicon controlled rectifiers connected to conduct oppositely across said terminals with each having a gate anode and cathode, a transformer having a primary winding and a pair of secondary windings, means connecting one of the secondary windings between the cathode and gate of one controlled rectifier and the other winding between the cathode and gate of the other controlled rectifier, a four junction rectifying bridge having a diode in each one of a pair of adjacent legs and a resistor in each of the other pair of adjacent legs, means connecting a junction of one pair of adjacent legs to one terminal and the junction of the other pair of adjacent legs to the other terminal, a unijunction transistor having two bases and an emitter, means connecting the two bases and the primary winding of the transformer in series across the other two junctions of the bridge, a resistance-capacitor network connected between the bases and the emitter, said network including a variable resistance for controlling the charging rate of the capacitor, means including a choke and condenser coupled to said terminals for preventing radio interference by the operation of the controlled rectifiers, and capacitance means connected between the other two junctions for preventing voltage surges from altering the charging rate whereby the period of conduction of the controled rectifiers may be varied to control the amount of electrical energy to the lamp.

2. An electric circuit adapted to be connected in series with an electric lamp across an alternating current source for adjustably controlling the amount of power to the electric lamp to thereby vary the illumination thereof comprising a pair of terminals, a pair of silicon controlled rectifiers connected to conduct oppositely across said terminals with each having a gate anode and cathode, a transformer having a primary winding and a pair of secondary windings, means connecting one of the secondary windings between the cathode and gate of one controlled rectifier and the other winding between the cathode and gate of the other controlled rectifier, a four junction rectifying bridge having a diode in each one of a pair of adjacent legs and a resistor in each of the other pair of adjacent legs, means connecting a junction of one pair of adjacent legs to one terminal and the junction of the other pair of adjacent legs to the other terminal, a unijunction transistor having two bases and an emitter, means connecting the two bases and the primary winding of the transformer in series across the other two junctions of the bridge, a resistance-capacitor network connected between the bases and the emitter, said network including a variable resistance for controlling the charging rate of the capacitor, means including a choke and condenser coupled to said terminals for preventing radio interference by the operation of the controlled rectifiers, capacitance means connected between the other two junctions for preventing voltage surges from altering the charging rate whereby the period of conduction of the controlled rectifiers may be varied to control the amount of electrical energy to the lamp, and switch means for disconnecting the electric circuit from the alternating current source.

References Cited by the Examiner

UNITED STATES PATENTS

| | | | |
|---|---|---|---|
| 2,790,898 | 4/1957 | Bady | 329—204 |
| 2,920,240 | 1/1960 | Macklem. | |
| 3,019,355 | 1/1962 | Morgan | 307—88.5 |
| 3,075,136 | 1/1963 | Jones | 321—45 |
| 3,097,314 | 7/1963 | Harriman | 307—88.5 |
| 3,146,392 | 8/1964 | Sylvan | 307—88.5 |

JOHN W. HUCKERT, *Primary Examiner.*

DAVID J. GALVIN, JAMES D. KALLAM, *Examiners.*

A. S. KATZ, L. ZALMAN, *Assistant Examiners.*